US008970333B2

(12) United States Patent
Mongeau

(10) Patent No.: US 8,970,333 B2
(45) Date of Patent: Mar. 3, 2015

(54) MAGNETIZER FOR ELECTRICAL MACHINES

(75) Inventor: Peter Mongeau, Center Conway, NH (US)

(73) Assignee: Vestas Wind Systems A/S, Aarhus N (DK)

( * ) Notice: Subject to any disclaimer, the term of this patent is extended or adjusted under 35 U.S.C. 154(b) by 10 days.

(21) Appl. No.: 13/977,498

(22) PCT Filed: Dec. 29, 2011

(86) PCT No.: PCT/DK2011/050521
§ 371 (c)(1),
(2), (4) Date: Aug. 2, 2013

(87) PCT Pub. No.: WO2012/089217
PCT Pub. Date: Jul. 5, 2012

(65) Prior Publication Data
US 2013/0314183 A1 Nov. 28, 2013

Related U.S. Application Data

(60) Provisional application No. 61/427,818, filed on Dec. 29, 2010.

(51) Int. Cl.
*H01F 13/00* (2006.01)
*H02K 15/03* (2006.01)
*H02K 7/18* (2006.01)

(52) U.S. Cl.
CPC .............. *H01F 13/003* (2013.01); *H02K 7/183* (2013.01); *H02K 15/03* (2013.01); *H02K 7/1838* (2013.01); *Y02E 10/725* (2013.01)

USPC .......................................................... 335/284

(58) Field of Classification Search
CPC ...... H01F 13/003; H01F 13/00; H01F 13/006; H02K 15/03; H02K 7/183; H02K 7/1838; Y02E 10/725
USPC .......................................................... 335/284
See application file for complete search history.

(56) References Cited

FOREIGN PATENT DOCUMENTS

| JP | H10014181 A | 1/1998 |
| JP | H10336976 A | 12/1998 |
| JP | 2009-004624 A | 1/2009 |

OTHER PUBLICATIONS

Machine translation of Applicant Cited Prior Art JP 2009-004624.*
Machine translation of Applicant Cited Prior Art JP H10336976.*
Machine translation of Applicant Cited Prior Art JP H10014181.*
International Search Report and Written Opinion, PCT/DK2011/050521, Oct. 31, 2012.

* cited by examiner

*Primary Examiner* — Bernard Rojas
(74) *Attorney, Agent, or Firm* — Patterson & Sheridan, LLP

(57) ABSTRACT

The present invention relates a device for magnetizing a rotor of an electrical machine with a power rating of at least 1 MW, wherein the rotor comprises permanent magnet material, said device comprising a yoke with an electromagnetic coil arranged to produce a pulsed magnetic field for magnetizing the permanent magnet material, wherein the magnetic field is sufficient to magnetize a permanent magnetic pole wherein the rotor and yoke is in a fixed relation to each other. The invention also relates to a method for magnetization of a rotor with permanent magnets for an electrical machine.

20 Claims, 9 Drawing Sheets ved to change the yoke. Add to this, that the invention makes the production more flexible if a more powerful magnetizer is desired with a

MAGNETIZER FOR ELECTRICAL MACHINES

FIELD OF THE INVENTION

The present invention relates to an apparatus for magnetizing permanent magnet material in a rotor, the invention further relates to a method for magnetizing permanent magnet material in a rotor.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general the use of electrical machine, and also for wind turbines comprises use of one of at least two basic types of generators i.e. generators based on electromagnetism or permanent magnets respectively. The present invention relates to a magnetizer for magnetizing a generator comprising permanent magnets (PM). The invention is not limited to electrical generators or machine in wind turbines; it applies to all other applications as well.

PM generators comprises two components i.e. a rotating magnetic field constructed using permanent magnets, known as the rotor and a stationary armature constructed using electrical windings located in a slotted iron core, known as the stator.

In magnetized condition said permanent magnets have a North-seeking pole and a South-seeking pole respectively. Opposite pole types attract, while poles of the same type repel each other. Furthermore poles of either type attract iron, steel and a few other metals such as nickel and cobalt. All of which is considered common knowledge of the person skilled in the art.

Permanent magnets are made of ferro- (or ferri-) magnetic material such as NdFeB, SiFe, SrFeO or the like. During the formation of the magnetic material, very small atomic groups called magnetic domains act as one magnetic unit and produces a magnetic moment. The same domains align themselves in the same direction over a small volume. In non-magnetized condition the plurality of domains of said permanent magnet are organized in a non-aligned way whereby they in a larger scale are substantially cancelling out each other resulting in no or a weak overall magnetic field.

By magnetizing a ferromagnetic permanent magnet e.g. by placing it in an external magnetic field such as produced in a solenoid with a direct current passing through it, all domains tend to align with the external magnetic field. Some domains align more easily than others so the resulting magnetic moment depends on the strength of the applied magnetic fields, increasing until all possible domains are aligned.

If a ferromagnetic material is exposed for temperatures above its specific Curie temperature it loses its characteristic magnetic ability as thermal fluctuations destroy the alignment of said domains.

Usually permanent magnets are substantially non magnetic when they are produced but must be magnetized later on, e.g. on the location of production, just before they are assembled or after they as components are built into e.g. generators. This invention relates to an idea where the rotor is being equipped with not magnetic permanent magnet material.

In a first aspect, the present invention relates to a device for magnetizing a rotor of an electrical machine with a power rating of at least 1 MW, wherein the rotor comprises permanent magnet material, said device comprising a yoke with an electromagnetic coil arranged to produce a pulsed magnetic field for magnetizing the permanent magnet material, wherein the magnetic field is sufficient to magnetize a permanent magnetic pole wherein the rotor and yoke is in a fixed relation to each other.

Each of the magnetic poles includes one or more permanent magnets that each is composed of a permanent magnetic material susceptible to being permanently magnetized by a strong pulsed magnetic field and, once magnetized, capable of generating a high electromagnetic field. When the permanent magnetic material is produced, atomic groups in small volumes are mutually aligned with a shared polarization direction known as magnetic domains in to produce magnetic moments.

To magnetize a pole of an electrical machine with a size bigger than 1 MW requires that the magnetic field covers an area equal to the pole or similar, and the flux density within the covered area needs at the same time to be nearly homogeneous, if not, the permanent magnet material is not utilized properly.

The large magnetic field is made with magnetizer yoke, made of laminated iron sheet or other material known in the field of laminated transformers or electrical machines. In the yoke there are a number of slots for receiving a coil of electrical windings. The coil is connected to a power supply which supplies the electrical energy to produce the magnetic field.

According to one embodiment of the invention the rotor is displaced in the radial direction before magnetizing a further permanent magnetic pole.

After magnetizing one magnetic pole the shaft of the rotor is rotated to align the rotor and the yoke for magnetizing the next magnetic pole.

According to one embodiment of the invention the ratio between the length of the at least one permanent magnetic pole and the length of the yoke is less than or equal to one.

An advantage of the present embodiment is that the manufacturing time is reduced since the magnetization process is one pulse per magnetic pole, since the physical length of the rotor lamination and the permanent magnet material is shorter than the length of the lamination of the yoke. Another advantage is that the magnetization bench do not need to have a system to move the rotor in the axial direction in relation to the yoke.

According to one embodiment of the invention the ratio between the length of the at least one permanent magnetic pole and the length of the yoke is between one and two, and wherein the rotor is displaced in the axial direction of the rotor between a first and a second magnetic pulse.

An advantage of the present embodiment is that the magnetizer can be designed to handle machine with rotors of various length, a rotor for a machine with a rating of 1 MW may have a length where one pulse can magnetize a pole, whereas a rotor with a rating of 2 MW with the same rotor diameter can be magnetized with 2 pulses.

According to one embodiment of the invention the yoke comprises a recessed area, wherein the recessed area is shaped to receive an angular section of the rotor.

An advantage of the present embodiment is that the air gap between the yoke and the rotor core is minimized. The size of the angular section should cover at least one magnetic pole.

According to one embodiment of the invention the device further comprises a rotor nest arranged on top of the yoke.

Advantages of present and previous claims are that there is no or very little air gap between yoke and rotor, and thus the magnetic energy needed to magnetize the magnetic pole is reduced. A further advantage is that the nest protects the surface of the rotor core against mechanical stresses during magnetization, especially during the pulsation of the magnetic field.

The rotor nest is for protection of the rotor during the magnetization, where large magnetic force applies to both the yoke and the rotor. The nest also ensures a specific air gap during the magnetization.

According to one embodiment of the invention the device further comprises a cooling arrangement for cooling the yoke.

An advantage of the present embodiment is that during the magnetization large amount of energy is dissipated into the coil in order to produce high magnetic fields in pulses. This will cause losses in the system that again will heat up the yoke. In order to be able to run the device frequently, a cooling system for the yoke is important.

According to one embodiment of the invention the device further comprising a power supply to provide electrical energy to the electromagnetic coil in the yoke to generate a magnetic field in order magnetize the permanent magnetic material.

An advantage of the present embodiment is that the magnetizer can supply the energy to produce the magnetic field. The energy may be stored in charged capacitors and the discharge is controlled by electronic switches.

According to one embodiment of the invention the device further comprises a clamp for maintaining the rotor in a fixed relation in respect to the yoke during magnetization.

According to one embodiment of the invention the device further comprising an indexer to rotate the rotor around a shaft of the rotor, the indexer is arranged to ensure that the magnetic material in the rotor is positioned in respect to the yoke.

An advantage of the present embodiment is that the indexer ensures the rotor with magnet assembly to proper positions for magnetization. To get an optimal magnetization of the PM material, the rotor with magnet assembly needs to be at the right position, i.e. the PM material should be aligned with the yoke. The indexer supports the rotor shaft, and may lock into existing rotor shaft Key Slot.

According to one embodiment of the invention the device further comprising an upper yoke with an second electromagnetic coil arranged to produce a pulsed magnetic field for magnetizing the permanent magnet material, wherein the magnetic field is sufficient to magnetize a second permanent magnetic pole, wherein the rotor and second yoke is in a fixed relation to each other.

According to one embodiment of the invention the yoke and the upper yoke is arranged so that the yoke and the upper yoke are arranged for magnetizing a permanent magnetic pole while the rotor and yokes are in a fixed relation to each other.

An advantage of the present embodiment is that the length of the upper yoke is so that a magnetic field provided by the upper yoke is suitable for magnetizing a magnetic pole, of a rotor with a given length, in a single pulse, and wherein the yoke has a length so that a magnetic field provided by the yoke is suitable for magnetizing a magnetic pole, of rotor with another length, in a single pulse.

The two yoke may share the power supply, or each may have its own power supply.

According to an embodiment of the invention the electrical machine is an electrical generator of a wind turbine.

In a second aspect, the present invention relates a method for magnetizing a rotor of an electrical machine with a power rating of at least 1 MW, wherein the rotor comprises permanent magnet material, said method comprising the step of
arranging the rotor in respect to a yoke in a fixed relation to each other, wherein the yoke has an electromagnetic coil arranged to produce a pulsed magnetic field,
pulsing the magnetic field for magnetizing the permanent magnet material, wherein the magnetic field is sufficient to magnetize a permanent magnetic pole.

The advantages of the second aspect are equivalent to the advantages for the first aspect of the present invention.

In a third aspect, the present invention relates to a control system to operate the device for magnetizing a rotor according to any of the above mentioned embodiments in order for the device to carry out the method of the second aspect in an automated manner.

An advantage of the present aspect is that the control system ensures a uniform magnetization of the electrical machines. This relates both from pole to pole, but also between machines. The control system can also record and log manufacturing data for each machine for further use.

In a fourth aspect, the present invention relates to a device for magnetizing and assembling an electrical machine comprising a stator and a rotor with a least one permanent magnet, the device comprising a magnetizer unit for magnetizing the at least one permanent magnet of the rotor, a rotor load unit and a translation unit for translating the rotor from the magnetizer unit to a rotor load unit for inserting the rotor into the stator.

An advantage of the present embodiment is that the device can handle the key components of the electrical machine while the magnets are magnetized.

According to an embodiment of the invention the translation unit comprises a rotor flip assembly and a rotor flip drive arranged to pivot the rotor flip assembly from a first position to a second position.

An advantage of the present embodiment is that the rotor flip assembly is arranged to move the rotor from the magnetizer unit to a rotor load unit in a part of a circular trajectory when the rotor flip assembly is pivoted by the rotor flip drive. When the magnets are magnetized or "alive" the forces needed to keep them away from magnetic material is tremendous, thus when moving the rotor it is important to move the rotor by means of handling tool with limited degrees of freedom, by using a pivoting arm only one degree of freedom has to be controlled.

According to an embodiment of the invention the rotor flip assembly comprises a rotor flip arm arranged to provide a down force on the rotor to keep the rotor in position in respect to the magnetizer unit during magnetization.

An advantage of the present embodiment is that the down force maintains direct contact between the surface of the magnetizer and the rotor core.

According to an embodiment of the invention the rotor load unit comprises a stator fixture for receiving the stator of the electrical machine and a first and a second fixture to receive and fixate a shaft of the rotor at a first and a second end of the shaft, the stator fixture is arranged to move linearly in respect to the rotor thereby moving the stator linearly and inserting the rotor into the stator.

An advantage of the present embodiment is that stator moves and the rotor is fixed. During the insertion of the rotor it is extremely important that the stator and the rotor only can move in relation to each other in the axial direction. When the permanent magnet material is magnetized, known as "live magnets", there is a high magnetic force the will try to attract magnetic material. If there is any movement in the other directions than the axial direction a risk of direct contact between rotor and stator exists.

According to an embodiment of the invention the rotor load unit comprises a stator fixture for receiving the stator of the electrical machine, and a rotor platform with a first and a second fixture to receive and fixate a shaft of the rotor at a first and a second end of the shaft, the rotor platform is arranged to move linearly in respect to the stator fixture thereby moving the rotor linearly and positioning the stator in relation to the rotor.

An advantage of the present embodiment is that rotor moves and the stator is fixed.

According to an embodiment of the invention a first and a second fixture is arranged to move linearly independently of each other to engage with the shaft of the rotor.

An advantage of the present embodiment is that the first and second fixture can move independently of each other, thus they can move apart before the rotor is received, when the rotor is aligned by the flip arm the first and second fixtures can move together and the rotor shaft is fixed in between the fixtures. After the fixation of the rotor the first and second fixtures will move together to maintain the fixation of the rotor.

According to an embodiment of the invention the rotor flip assembly is mounted on a displacement track to move the rotor flip assembly parallel to the rotor shaft (21).

According to an embodiment of the invention the magnetizer unit is mounted on a displacement track to move the magnetizer unit parallel to the rotor shaft (21).

An advantage of the present and previous embodiment is that rotor can be displaced in respect to the yoke of the magnetizer.

According to an embodiment of the invention the rotor flip assembly moves the rotor from a first position to a second position between magnetization pulses.

An advantage of the present embodiment is that rotor can be displaced in respect to the yoke of the magnetizer, thus the rotor core can be longer than the laminated rotor core, and still magnetize a magnetic pole of the rotor by use of two magnetic pulses.

In a fifth aspect, the present invention relates a method for magnetizing and assembling an electrical machine comprising a stator and a rotor with a least one permanent magnet at a magnetizing unit, comprising a magnetizer unit for magnetizing the at least one permanent magnet of the rotor, a rotor load unit and a translation unit for translating the rotor from the magnetizer unit to a rotor load unit for inserting the rotor into the stator, the method comprising the step of
- magnetization of the at least one permanent magnet in the rotor, with the magnetizer yoke assembly,
- translating the magnetized rotor from the magnetizer yoke assembly to the rotor insert unit with the translation unit,
- inserting the rotor into a stator of the electrical machine with the load unit.

According to an embodiment of the invention the step of translating the magnetized rotor is performed by the translation unit by pivoting the rotor flip assembly, with rotational forces from a rotor flip drive, from a first position to a second position.

According to an embodiment of the invention the step of magnetization, the rotor flip assembly provides a down force on the rotor to keep the rotor in position in respect to the magnetizer unit by means of a rotor flip arm.

According to an embodiment of the invention the step of inserting comprises:
- the rotor load unit receiving the stator of the electrical machine at a stator fixture
- the rotor load unit fixating a shaft of the rotor at a first and a second end of the shaft at a first and a second fixture,
- the stator fixture moving linearly in respect to the rotor thereby moving the stator linearly and inserting the rotor into the stator.

According to an embodiment of the invention the step of inserting comprises:
- rotor load unit receiving the stator of the electrical machine at a stator fixture
- rotor load unit fixating a shaft of the rotor at a first and a second end of the shaft at a first and a second fixture,
- the first and a second fixture moving linearly in respect to the stator fixture thereby moving the rotor linearly and positioning the stator in relation to the rotor.

The advantages of the fifth aspect are equivalent to the advantages for the fourth aspect of the present invention.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 2:
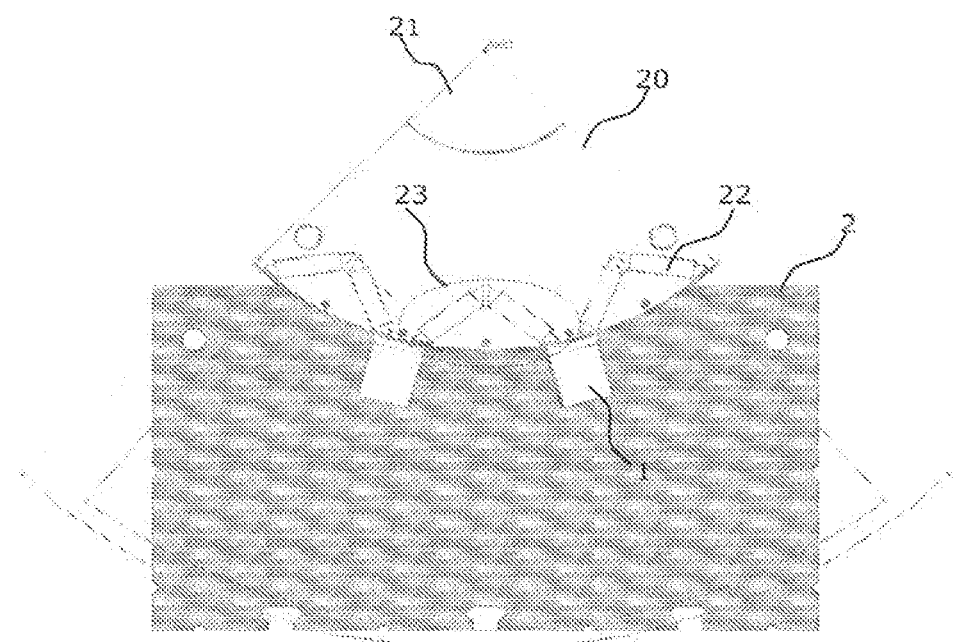
FIG. 2 shows an end view of the rotor laying on the yoke, the rotor is aligned with yoke, the Figure only shows an angular section of the rotor.

In general the use of electrical machine, and also for wind turbines, comprises use of one of at least two basic types of generators i.e. generators based on electromagnetism or permanent magnets 22 respectively (see FIG. 2). The present invention relates to a magnetizer for magnetizing a generator comprising permanent magnets (PM) 22. The invention is not limited to electrical generators or machine in wind turbines; it applies to all other applications as well.

PM generators comprises two components i.e. a rotating magnetic field constructed using permanent magnets 22, known as the rotor 20 and a stationary armature constructed using electrical windings located in a slotted iron core, known as the stator.

In magnetized condition said permanent magnets 22 have a North-seeking pole and a South-seeking pole respectively. Opposite pole types attract, while poles of the same type repel each other. Furthermore poles of either type attract iron, steel and a few other metals such as nickel and cobalt. All of which is considered common knowledge of the person skilled in the art.

Permanent magnets 22 are made of ferro- (or ferri-) magnetic material such as NdFeB, SiFe, SrFeO or the like. During the formation of the magnetic material, very small atomic groups called magnetic domains act as one magnetic unit and produces a magnetic moment. The same domains align themselves in the same direction over a small volume. In non-magnetized condition the plurality domains of said permanent magnet are organized in a non-aligned way whereby the in a larger scale are substantially cancelling out each other resulting in no or a weak overall magnetic field.

By magnetizing a ferromagnetic permanent magnet e.g. by placing it in an external magnetic field such as produced in a solenoid 1 with a direct current passing through it, all domains tend to align with the external magnetic field. Some domains align more easily than others so the resulting magnetic moment depends how strong the applied magnetic fields is, increasing until all possible domains are aligned.

If a ferromagnetic material is exposed for temperatures above its specific Curie temperature it loses its characteristic magnetic ability as thermal fluctuations destroy the alignment of said domains.

Usually permanent magnets 22 are substantially not magnetic when they are produced but must be magnetized later on, e.g. on the location of production, just before they are assembled or after they as components are built into e.g. generators. This invention relates an idea where the rotor is being equipped with not magnetic permanent magnet material.

In a first aspect, the present invention relates to a device for magnetizing a rotor of an electrical machine with a power rating of at least 1 MW, wherein the rotor 20 comprises permanent magnet material, the magnetization device 101 comprising a yoke or lamination core 2 with an electromagnetic coil 1 arranged to produce a pulsed magnetic field for magnetizing the permanent magnet material, wherein the magnetic field is sufficient to magnetize a permanent magnetic pole 23 wherein the rotor 20 and laminated core or yoke 2 is in a fixed relation to each other.

Each of the magnetic poles 23 includes one or more permanent magnets 22 that each composed of a permanent magnetic material susceptible to being permanently magnetized by a strong pulsed magnetic field and, once magnetized, capable of generating a high electromagnetic field. When the permanent magnetic material is produced, atomic groups in small volumes are mutually aligned with a shared polarization direction known as magnetic domains in to produce magnetic moments.

To magnetize a magnetic pole 23 of an electrical machine with a size bigger than 1 MW requires that the magnetic field covers an area equal to the pole or similar. The flux density within the covered area needs at the same time to be nearly homogeneous, if not, the permanent magnet material is not utilized properly.

The large magnetic field is made with magnetizer yoke, made of laminated iron/steel sheets or other material known in field of laminated transformers or electrical machines. In the yoke 2 there are a number of slots for receiving a coil 1 of electrical windings. The coil 1 is connected to a power supply 13 which supplies the electrical energy to produce the magnetic field.

Figure 1:
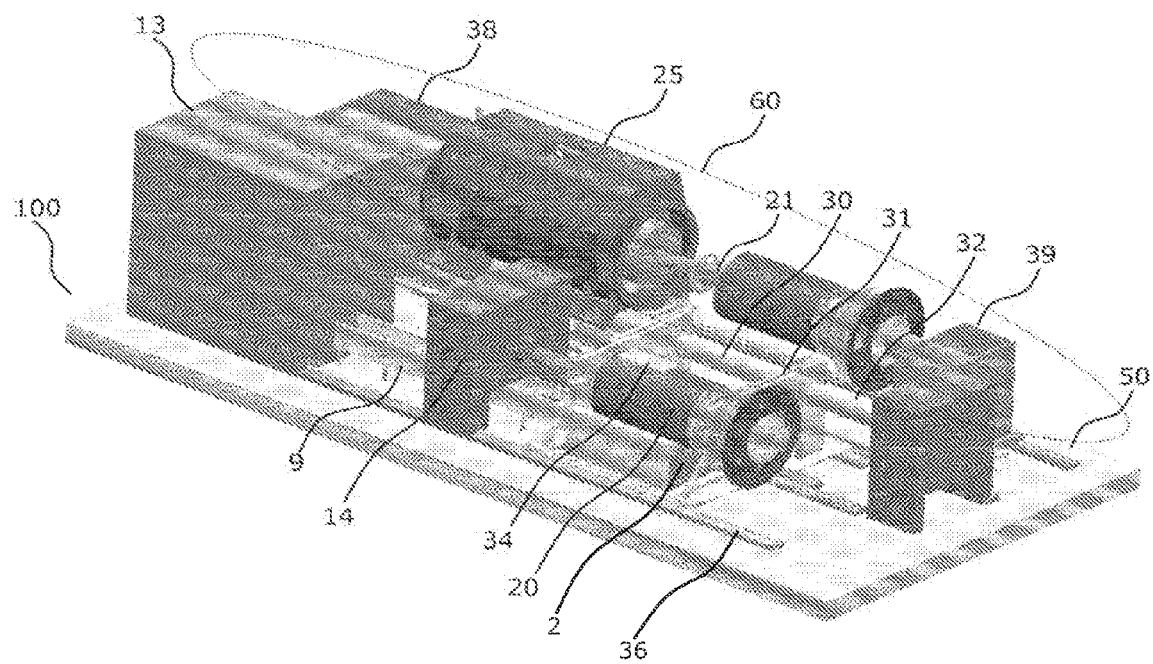
FIG. 1 shows a complete magnetizer and rotor load unit according an aspect on the invention.

FIG. 1 shows a magnetizing and machine assembly for insertion of the rotor 20 into the stator 25 including handling equipment 31 for handling the rotor 20 with magnetized permanent magnets 22. The figure shows the component mounted on a system base 50, with a rotor located at the magnetizer yoke assembly 101, the shaft 21 of the rotor is attached to a rotary indexer 14, the yoke assembly 101 is fed with electrical energy through cables in a cable conduit 9, and the electrical energy is supplied from a power supply 13. The rotor 20 is kept in a fixed relation to the yoke 2, by a rotor flip arm 31 that can grip the ends of the shaft 21, in addition there is a machine clamp 34 to keep the rotor in place. The machine clamp 34 provides a down force on the rotor core 20 during magnetization.

According to an embodiment of the invention the rotor flip assembly 30 comprises a rotor flip arm 31 arranged to provide a down force on the rotor to keep the rotor in position in respect to the magnetizer unit during magnetization. The down force maintains direct contact or maintains an air gap between the surface of the magnetizer and the rotor core 20.

Figure 7:
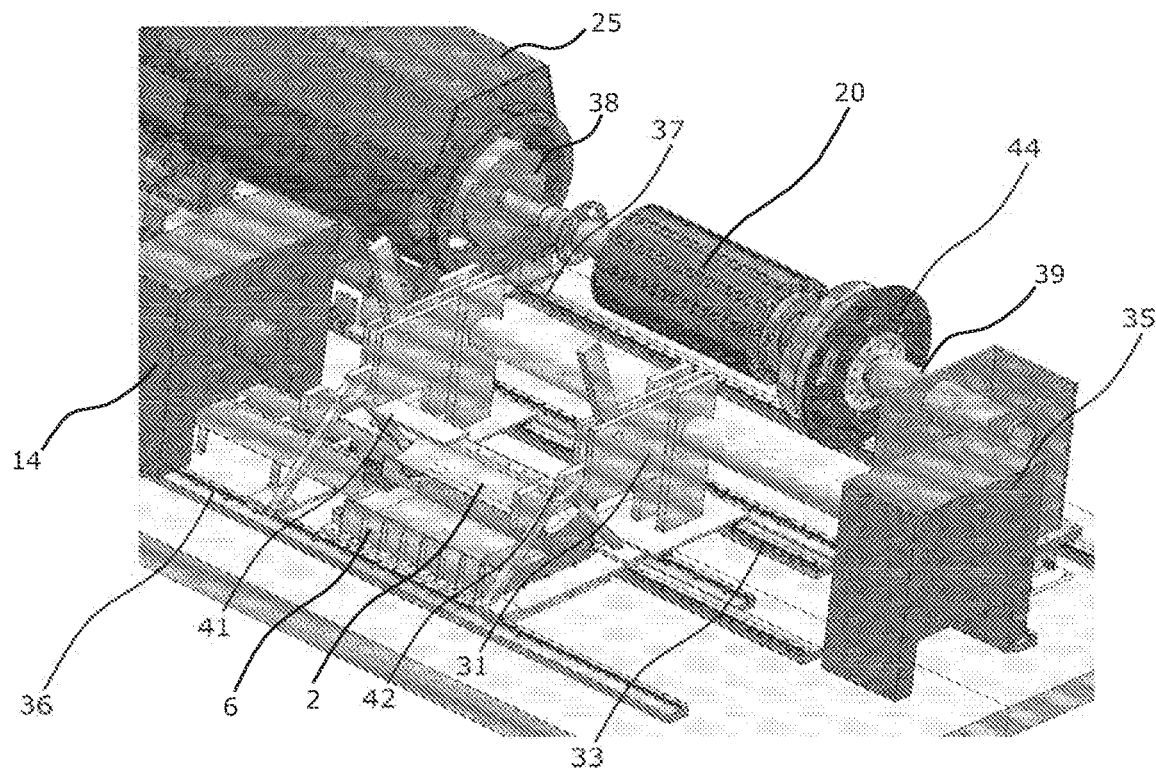
FIG. 7 shows a rotor engaged at the rotor load fixtures, ready to be inserted into a stator housing. The rotor flip arm is ready to receive a new rotor at the magnetizer.

According to an embodiment of the invention as seen in FIG. 7, the magnetizer unit is mounted on a displacement track 36 to move the magnetizer unit 101 parallel to the rotor shaft 21.

In one embodiment, the power supply 13 (see FIG. 1) includes a bank of capacitors, a switching device connecting the capacitor bank with the leads of the coil 1, a charging circuit configured to charge the capacitor bank, and a control system 80 (not shown in the Figures). The control circuit is configured to activate the charging circuit to charge the capacitor bank and is also configured to actuate the switching device to abruptly discharge the stored charge from capacitor bank as a transient high-voltage direct current pulse through the coil 1. The switching device may be, for example, a silicon controlled rectifier. The stored charge released from the capacitor bank generates the direct current pulse in the turns of the coil 1, which in turn generates the relatively strong magnetic field of short duration (typically a few milliseconds) used to magnetize each magnetic pole 23. As the direct current pulse in the coil 1 dissipates, the external magnetic field collapses. The control circuit can cause the capacitor bank and switching device to output direct current pulses to the coil 1 with current flow in either a clockwise direction or a counter clockwise direction to produce a magnetic field of two different polarities according to Faraday's Law. In an alternative embodiment, the charging circuit may be a different type of circuit capable of producing a signal having a current level and a rate change of current adequate to generate the requisite direct current pulses.

The power supply 13 is then used to magnetize the permanent magnets 22 constituting the pole 23. The control circuit 80 of power supply 13 is operated to activate the charging circuit to charge the capacitor bank. When sufficiently charged, the control circuit actuates the switching device of power supply 13 to abruptly discharge the stored charge from capacitor bank as a first current pulse through the coil 1 in a, for example, clockwise direction. The passage of the first current pulse through the coil 1 generates a magnetic field.

After the rotor 20 is fully magnetized it is ready to be inserted into the stator 25. In order to transfer the rotor 20 safe from the magnetizer 101 to the rotor load unit 60 a rotor flip assembly 30 is used. The rotor flip assembly can be seen in FIG. 7, where the rotor flip arms 31 are empty. The rotor flip arms are mounted to a flip shaft 32 that can rotate and thus pivot a rotor from the magnetizer 101 to the rotor load unit 60. The shaft rotates by a flip drive 35, which can be controlled by an automated control system 80. The rotor flip arms 31 has a shaft lock 40 attached to each of the arms. The shaft locks 40 locks the rotor shaft 21 and maintain the rotor shaft in the recessed area 42 of the rotor flip arm 31.

An advantage of the present embodiment is that the device can handle the key components of the electrical machine while the magnets are magnetized. According to an embodiment of the invention the translation unit comprises a rotor flip assembly and a rotor flip drive arranged to pivot the rotor flip assembly 30 from a first position to a second position. An advantage of the present embodiment is that the rotor flip assembly 30 is arranged to move the rotor from the magnetizer unit in a part of a circular trajectory when the rotor flip assembly is pivoted by the rotor flip drive. When the magnets are magnetized or "alive" the forces needed to keep them away from magnetic material, such as iron etc. is tremendous, thus when moving the rotor 20 it is important to move it by means of handling tool with limited degrees of freedom, by using a pivoting arm 31 only one degree of freedom has to be controlled by the automated control system 80.

In an embodiment of the present invention the rotor flip assembly 30 moves the magnetized rotor from the magnetizer 101 to the rotor load unit 60 by means of a robotic manipulator, wherein the move is handled in a combination of rotational and linear paths.

In an embodiment of the present invention the rotor flip assembly 30 moves the magnetized rotor from the magnetizer 101 to the rotor load unit 60 by means of vehicle, where the magnetized rotor is placed onto the vehicle (not shown) and moved to the rotor load unit 60 where the rotor is placed in the rotor load unit 60.

Figure 9:
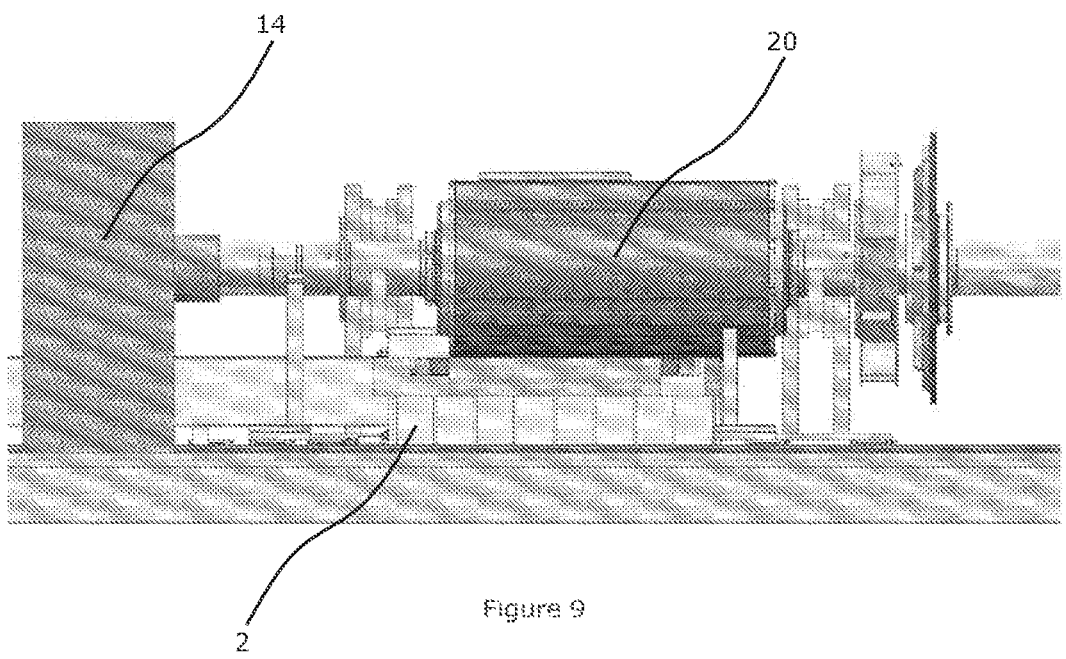
FIG. 9 shows a side view of the magnetizer with a rotor placed on the yoke, the length of the rotor lamination is larger than the length of the yoke lamination. The rotor is at a first position.

According to an embodiment of the invention the rotor flip assembly is mounted on a displacement track 33 to move the rotor flip assembly 30 parallel to the rotor shaft 21. The movement of the rotor flip assembly is important when magnetizing magnetic pole 23 in rotors 20 longer than the yoke 2, as seen in FIG. 9. According to one embodiment of the invention the rotor is displaced in the radial direction before magnetizing a further permanent magnetic pole.

Figure 8:
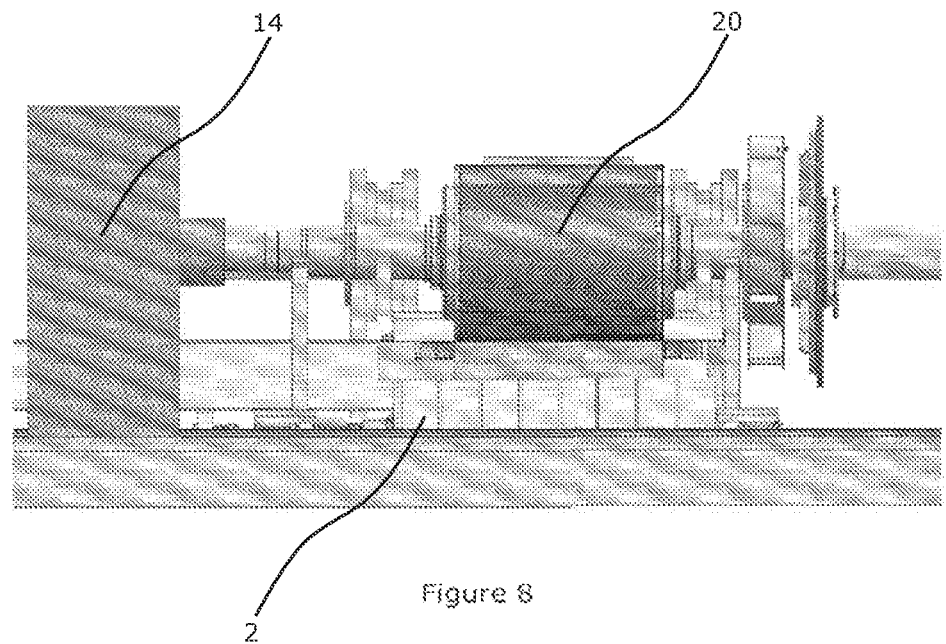
FIG. 8 shows a side view of the magnetizer with a rotor placed on the yoke, the length of the rotor lamination is equal or less than the length of the yoke lamination.

According to one embodiment of the invention the ratio between the length of the at least one permanent magnetic pole and the length of the yoke is less than or equal to one, this is what is shown in FIG. 8 where the length of the rotor core 20 fits the length of the magnetizer yoke 2. An advantage of this is that the manufacturing time is reduced, since the magnetization process is one pulse per magnetic pole, since the physical length of the rotor lamination and the permanent magnet material is shorter than or equal the length of the lamination of the yoke. Another advantage is that the magnetization bench do not need to have a system 33 to move the rotor in the axial direction in relation to the yoke.

Figure 10:
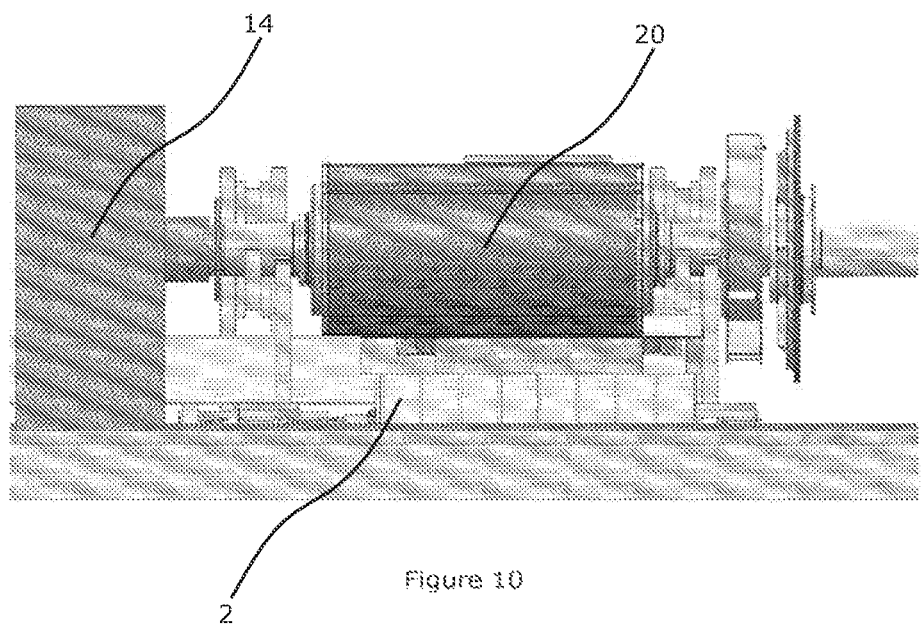
FIG. 10 shows a side view of the magnetizer with a rotor placed on the yoke, the length of the rotor lamination is larger than the length of the yoke lamination. The rotor is at a second position.

According to one embodiment of the invention the ratio between the length of the at least one permanent magnetic pole and the length of the yoke is between one and two, and wherein the rotor is displaced in the axial direction of the rotor between a first and a second magnetic pulse. This means that either the rotor 20 is moved by the rotor flip assembly 30 or the magnetizer yoke assembly 101 is moved. The first position is shown in FIG. 9 and the second is shown in FIG. 10, or opposite. An advantage of present embodiment is that the magnetizer can be designed to handle machine with rotors of various length, a rotor for a machine with a rating of 1 MW may have a length where one pulse can magnetize a pole, whereas a rotor with a rating of 2 MW with the same rotor diameter can be magnetized with 2 pulses.

FIG. 2 shows an end view of the magnetizer yoke 2, with a cut out section of a rotor 20 for magnetization. Each of the magnetic poles 23 includes one or more permanent magnets 22 that are each composed of a permanent magnetic material susceptible to being permanently magnetized by a strong magnetic field and, once magnetized, capable of generating a high electromagnetic field. The actual magnetization occurs when a short high current pulse flows through the coil 1 in the yoke 2. This generates a high magnetic field and the magnetic material in the magnetic pole 23 is magnetized. Depending on the physical length of the yoke 2 and the length of the rotor core 20, one or two pulses are needed to magnetize the magnetic pole 23 in the full length. After one magnetic pole has been magnetized any forces, applied on the rotor 20 by the flip arm 31 and the machine clamp 34, are released. The rotary indexer 14 (see FIG. 1) can rotate the rotor 20 to align it with the non magnetic permanent magnetic material becoming the adjacent magnetic pole 23 when magnetized. This process is continued until the rotor 20 is fully magnetized.

The indexer 14 (see FIG. 1) ensures the rotor with magnet assembly in proper positions for magnetization. To get an optimal magnetization of the PM material, the rotor with magnet assembly needs to be at the right position, i.e. the PM material should be aligned with the yoke 2. The indexer 14 (see FIG. 1) supports the rotor shaft 21, and may lock into existing rotor shaft Key Slot (not shown).

When the permanent magnetic material is produced, atomic groups in small volumes are mutually aligned with a shared polarization direction known as magnetic domains in to produce magnetic moments. In a non-magnetized condition, the various domains of the permanent magnetic material in each permanent magnet 22 are organized with different alignments such that, on a larger scale, the magnetic moments effectively cancel each other resulting in no net magnetic field or a weak overall magnetic field. All domains tend to align with an external magnetic field in order to magnetize the magnetic material. Some domains align more easily than others so the resulting magnetic field of the magnetized permanent magnet 22 is dependent upon the strength of the applied external magnetic field.

In one embodiment, each permanent magnet 22 is a rare-earth magnet containing a permanent magnetic material composed of an alloy containing one or more rare earth (lanthanide) elements, such as neodymium or samarium, that are ferromagnetic metals. Certain alloys containing rare earth elements and transition metals, such as iron, nickel, or cobalt, have a Curie temperature far above room temperature, which is a desirable property for the permanent magnets 22. Representative alloys suitable for the permanent magnetic material of permanent magnets 22 include, but are not limited to, a samarium alloy containing cobalt ($SmCo_5$) and a neodymium alloy containing iron and boron ($Nd_2Fe_{14}B$). A plating layer or coating may be applied to protect the permanent magnets 22 against corrosion, breakage, and chipping. Rare earth alloys are characterized by a crystalline structure of large magnetic anisotropy that promotes magnetization in one particular direction by a strong magnetic field but, once magnetized, is resistant to being magnetized in any different direction. The permanent magnetization may be altered by intentionally applying a magnetic field that is intended to demagnetize the permanent magnetic material.

In an embodiment of an electrical machine, each magnetic pole 23 includes multiple individual permanent magnets 22 that are adhesively bonded to an outer surface of the rotor frame or joined thereto using mechanical clips, frames, or other conventional mechanical fastening techniques to form each magnetic pole 23. Alternatively, instead of multiple magnets 54, each of the magnetic poles 23 may be constituted by a single, unitary permanent magnet 22 of a monolithic construction.

In alternative embodiments, the permanent magnetic material in the permanent magnets 22 may be a ceramic or ferrite material, or alnico. However, rare earth alloys are preferred for the permanent magnets 22 because of a comparatively higher remanence ($B_r$) that is related to magnetic field strength, a comparatively higher coercivity ($H_{ci}$) that gauges resistance to demagnetization, and a comparatively higher energy product ($BH_{max}$) that is related to energy density.

The permanent magnets 22 are illustrated as having the shape of rectangular blocks that, if multiple permanent magnets 22 are present in each magnetic pole 23, have an end-to-end arrangement. However, each permanent magnet 22 is not constrained to have a rectangular block shape. The permanent magnets 22 also have a slight curvature to conform to the shape of the outer surface of the rotor frame, if mounted on the surface instead of being embedded in the rotor core 20. The magnetization system 100 (see FIG. 1) generates a strong or high intensity magnetic field of short duration that is used to magnetize the magnetic material in the permanent magnets 22 of the magnetic poles 23. The magnetization system 100 (see FIG. 1) generates the magnetic field by causing a transient high current pulse to be directed from the power supply 13 (see FIG. 1) through the turns of the coil 1 of magnetizer yoke assembly 101 (see FIG. 3). The discrete magnetic fields generated by the individual turns of the coil 1 constructively add to yield the total magnetic field emanating from the magnetizer yoke assembly 101 when the coil 1 is energized. The magnetic field generated by the coil 1 generally scales with increasing current level of the current pulse and with the number of turns in the coil 1.

Figure 3:
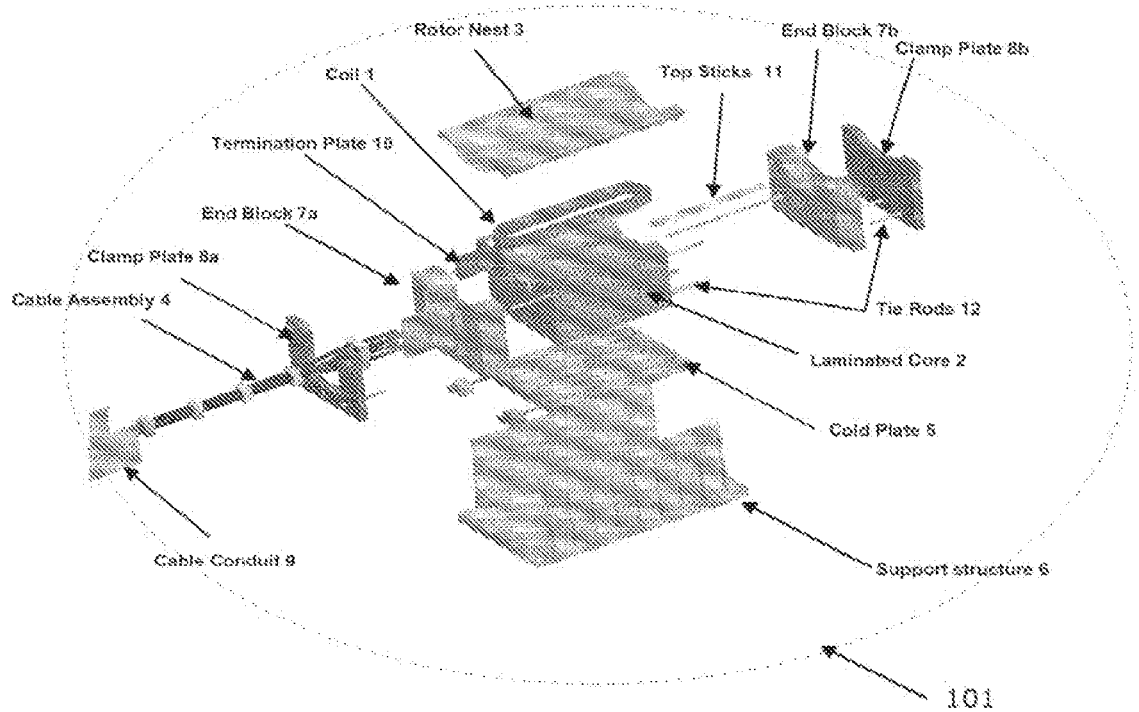
FIG. 3 shows a disassembled yoke with many of the key features.

FIG. 3 shows a detailed view of the magnetizer yoke assembly 101. The heart of the system is the coil 1 in which a current from the power supply 13 (see FIG. 1) can flow and then cause a magnetic flux for magnetization of permanent magnet material. The coil 1 is embedded in slots in a laminated core 2, an end block 7a, 7b is placed at both ends of the laminated core 2, and the core is terminated by a clamp plate 8a, 8b also at both ends. All the parts of the core are tied together by tie rods 12. On top of the coils in the slot, top sticks 11 are placed to protect the coil 1. According to one embodiment of the invention the yoke comprises a recessed area, wherein the recessed area is shaped to receive an angular section of the rotor. The air gap between the yoke and the rotor core is therefore minimized. The size of the angular section should cover at least one magnetic pole 23.

In the embodiment, a rotor nest 3 is placed on top of the yoke assembly 101. The rotor nest is to protect the rotor core 20, but also to ensure a well defined air gap between the rotor core and the laminated core 2. There is no or very little air gap between yoke and rotor, and thus the magnetic energy needed to magnetize the magnetic pole is reduced. In an embodiment the nest 3 is made of a soft flexible material that is deformable in order to protect the rotor core 20. In one embodiment the nest is made of a material that conducts the magnetic flux from the laminated core of the yoke 2 to the rotor core 20. An advantage is that the nest 3 protects the surface of the rotor core against mechanical stresses during magnetization, especially during the pulsation of the magnetic field, where large magnetic force applies to both the yoke and the rotor.

The coil is connected to the power supply 13 through a cable assembly 4. The cable assembly is placed in a cable conduit 9.

In order to keep the core 2 at a preferred operating temperature the core is placed on a cold plate 5. The cold plate 5 is equipped with pipes for a liquid coolant and the pipes can be attached to a liquid cooling system that will keep the temperature in the core 2. In other embodiments the cooling system may comprise the coolant pipes embedded in the core 2. During the magnetization large amount of energy is dissipated into the coil 1 in order to produce high magnetic fields in pulses. This will cause losses in the system that again will heat up the yoke core 2. In order to be able to run the device frequently, a cooling system for the yoke is important.

The cold plate 5 is placed in a support structure 6 and on top of that the core 2 is placed.

In one embodiment of the invention the device further comprises an upper yoke with a second electromagnetic coil arranged to produce a pulsed magnetic field for magnetizing the permanent magnet material, wherein the magnetic field is sufficient to magnetize a second permanent magnetic pole, wherein the rotor and second yoke is in a fixed relation to each other. The second yoke can be located opposite the first yoke 2, so the two yokes are displaced 180 degrees around the periphery of a rotor core 20. The length of the yoke may be the same or they can be different. The yokes may operate so both of them can magnetize a magnetic pole 23 while the rotor is fixed. They may operate independent of each other or the may share the power supply 13. If they share the power supply, only one yoke at the time may pulse a magnetic field.

Figure 11:
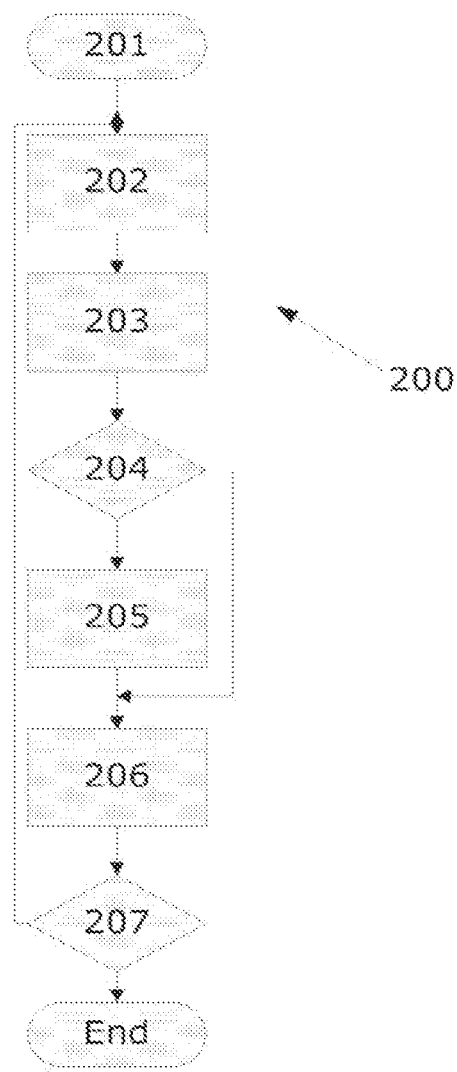
FIG. 11 shows a flow chart of a method for magnetizing a rotor of an electrical machine with a power rating of at least 1 MW, where the rotor comprises permanent magnet material, according to the invention.

The method for magnetizing a rotor of an electrical machine with a power rating of at least 1 MW, where the rotor comprises permanent magnet material, is shown in the flow chart 200 in FIG. 11. After the start 201 the method does comprise the steps;

Step 202 is arranging the rotor 20 in respect to the yoke 2 in a fixed relation to each other, wherein the yoke has an electromagnetic coil 1 arranged to produce a pulsed magnetic field, Step 203 is pulsing the magnetic field for magnetizing the permanent magnet material 22, wherein the magnetic field is sufficient to magnetize a permanent magnetic pole 23.

Whenever the rotor 20 is longer than the yoke 2, Step 204 is for deciding whether the rotor 20 needs to be shifted (step 205) in the axial direction, (see FIG. 9 and FIG. 10 that shows the rotor 20 in two different positions), Step 206 rotates the rotor 20 to align further magnetic poles with yoke 2. Step 207 decides whether all magnetic material has been magnetized, i.e. the rotor has been rotated 360 degrees. Step 208 concludes the method.

Figure 12:
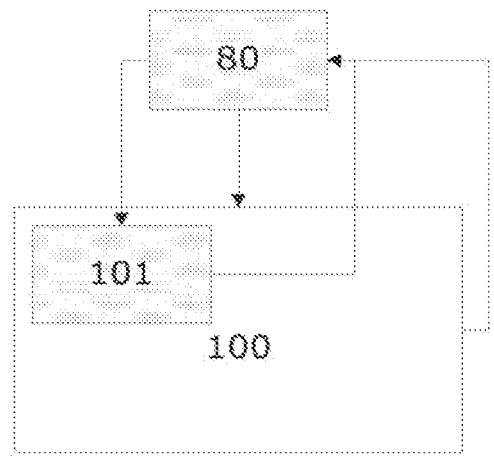
FIG. 12 shows a system according to the invention where magnetizer yoke assembly 101 is a sub part of the magnetization system 100.

A machine with only one magnetic pole only requires the steps 202, 203 and 208. FIG. 12 shows the invention where magnetizer yoke assembly 101 is a sub part of the magnetization system 100. A control system 80 operates the magnetizer yoke assembly and gets feedback from it. For magnetizing a rotor 20 according to any of the mentioned embodiments in order for the device to carry out the method in an automated manner the control system executes the needed commands. An advantage of the control system is that it ensures a uniform magnetization of the electrical machines. This relates both from pole to pole, but also between machines. The control system 80 can also record and log manufacturing data for each machine for further use. The control system 80 also controls whole the magnetization system 100.

The magnetisation system 100 as shown in FIG. 1 is a device for magnetizing and assembling an electrical machine with a stator and a rotor 20 with a least one permanent magnet 22, the device 100 comprising a magnetizer unit 101 for magnetizing the at least one permanent magnet 22 of the rotor, a rotor load unit 60 and a translation unit 30 for translating the rotor 20 from the magnetizer unit to a rotor load unit 60 for inserting the rotor into the stator.

In an embodiment of the invention the rotor load unit 60 comprises a stator fixture 42 (see FIG. 6) for receiving the stator of the electrical machine and a first 38 and a second fixture 39 to receive and fixate a shaft of the rotor at a first and a second end of the shaft, the stator fixture is arranged to move linearly in respect to the rotor thereby moving the stator linearly and inserting the rotor into the stator. The stator platform moves along stator displacement track 37.

Figure 4:
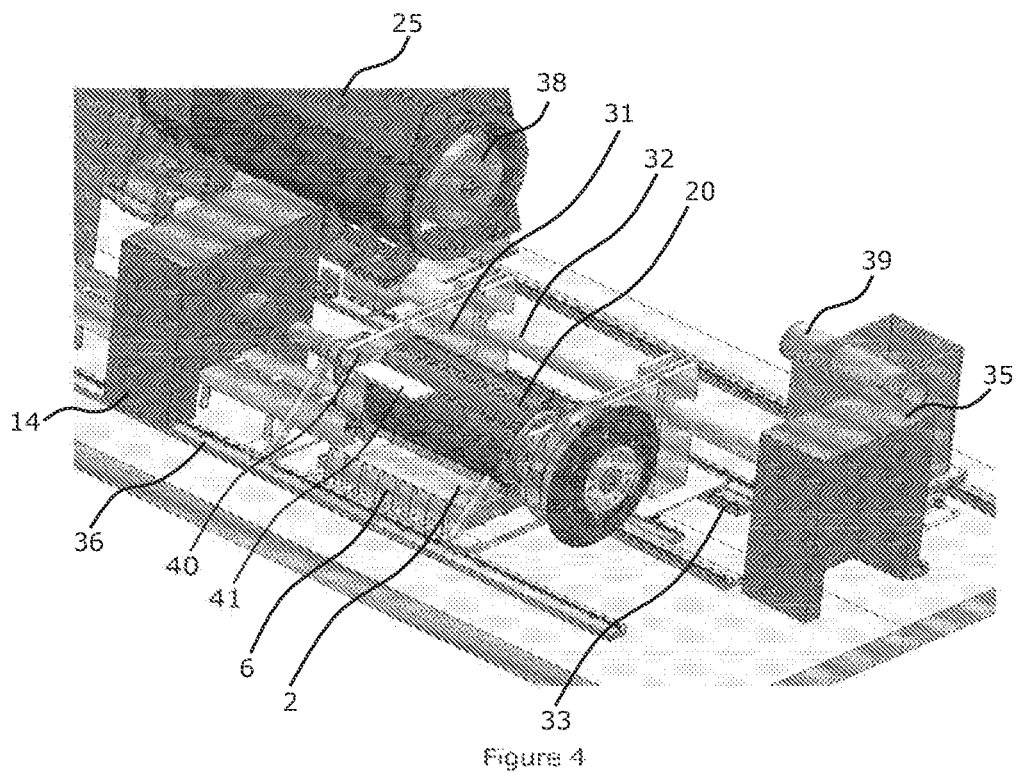
FIG. 4 shows the device with a rotor on the yoke hold by the clamp and with the flip attached to each ends of the rotor shaft.

FIG. 4 shows a rotor 20 at the yoke 2 the flip arm 31 are holding the rotor 20 at the rotor shaft 21. The shaft lock 40 locks the rotor 20, and the main clamp 41 applies a down force on the rotor 20.

Figure 5:
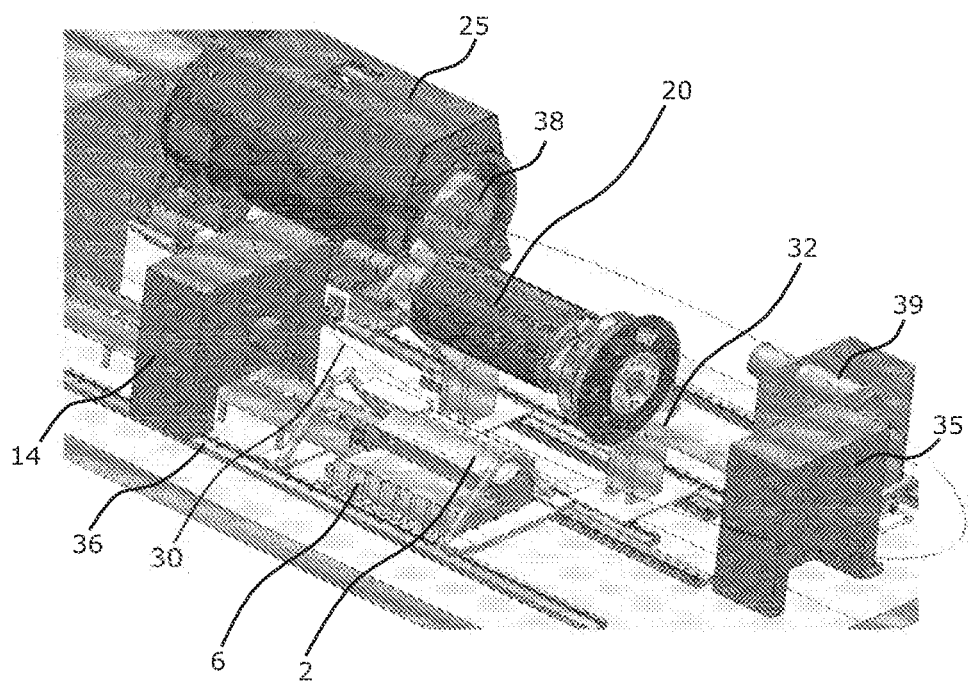
FIG. 5 shows a rotor pivoting from the magnetizer yoke to the rotor load unit.
Figure 6:
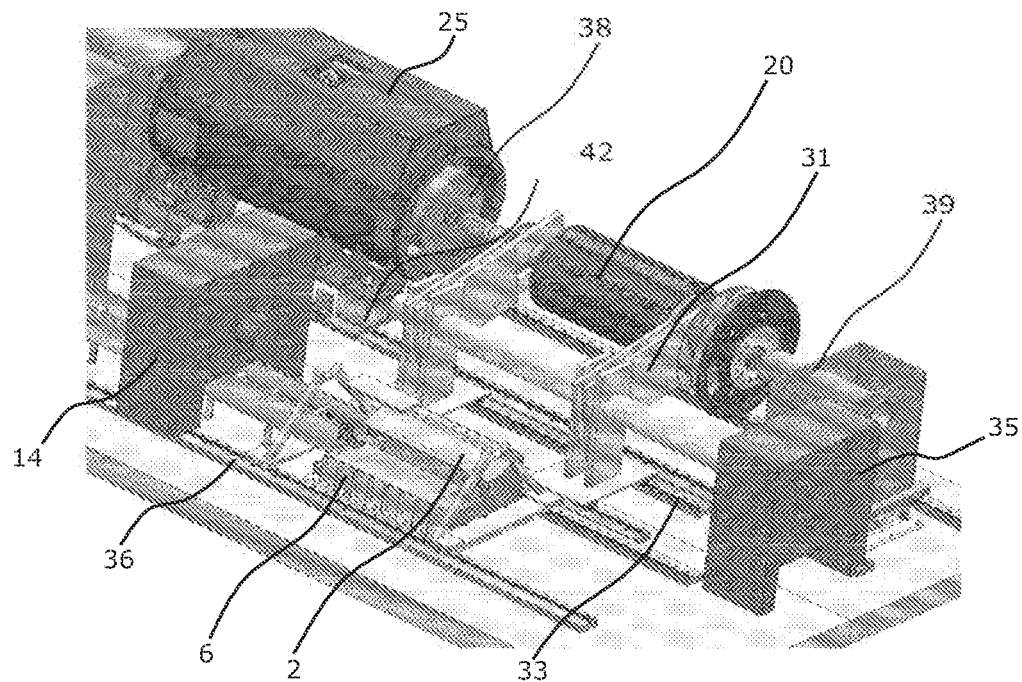
FIG. 6 shows a rotor at the rotor load unit without the rotor load fixtures engaged at the end of the rotor, the flip arms still carries the rotor.

FIG. 5 shows the rotor 20 in the transition state where it is pivoted by the rotor flip assembly 30, from the magnetizer yoke assembly to the rotor load unit 60 (see FIG. 1). In FIG. 6 the rotor 20 has been pivoted all the way to the rotor load unit 60, and is ready to be fixed at the first and second fixtures 38 and 39. The first and second fixture 38, 39 can move independently of each other, thus they can move apart before the rotor is received, when the rotor is aligned by the flip arm 31 the first and second fixtures 38, 39 can move together and the rotor shaft 21 is fixed in between the fixtures. After the fixation of the rotor the first 38 and second fixtures 39 will move together to maintain the fixation of the rotor 20 through the shaft 21.

FIG. 7 shows the rotor 20 fixed at the first and second fixtures 38 and 39. The rotor flip arms 31 have been pivoted back to the magnetizer yoke assembly 101. The rotor 20 is ready to be insert into the stator housing 25 (see FIG. 1). The stator housing 25 moves along the load unit displacement tracks 37, until the rotor is fully enclosed in the stator housing. The rotor is fixed in the stator housing by locking the machine end shield 44 to the stator housing 25.

During the insertion of the rotor it is extremely important that the stator and the rotor only can move in relation to each other in the axial direction. When the permanent magnet material is magnetized, known as "live magnets", there is a high magnetic force the will try to attract magnetic material. If there is any movement in the other directions than the axial direction a risk of direct contact between rotor and stator exists.

In another embodiment of the invention the rotor load unit comprises a stator fixture for receiving the stator of the electrical machine, and a rotor platform with a first and a second fixture 38, 39 to receive and fixate a shaft of the rotor at a first and a second end of the shaft 21, the rotor platform is arranged to move linearly in respect to the stator fixture thereby moving the rotor linearly and positioning the stator in relation to the rotor. An advantage of the present embodiment is that rotor moves and the stator is fixed.

Figure 13:
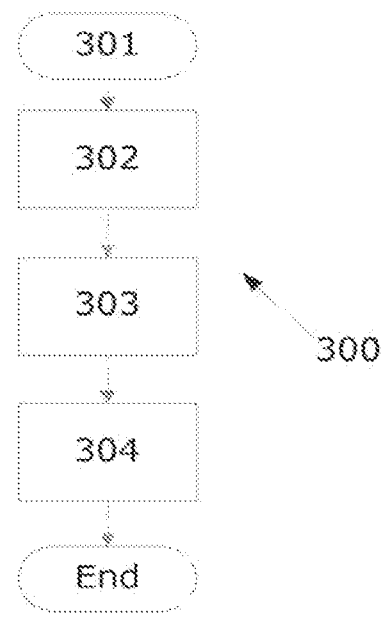
FIG. 13 shows a flow chart of a method for magnetizing and assembling a rotor of an electrical machine with a power rating of at least 1 MW, where the rotor comprises permanent magnet material, according to the invention.

The method for magnetizing and assembling an electrical machine comprising a stator and a rotor with a least one permanent magnet at a magnetizing unit 101, comprising a magnetizer unit for magnetizing the at least one permanent magnet 22 of the rotor 20, a rotor load unit 60 and a translation unit 30 for translating the rotor 20 from the magnetizer unit 101 to a rotor load unit 60 for inserting the rotor 20 into the stator 25, the method 300 is shown in FIG. 13. The method 300 starts in step 301. the magnetization of the at least one permanent magnet 22 in the rotor 20, with the magnetizer yoke assembly 101 is step 302. Step 303 is translating the magnetized rotor from the magnetizer yoke assembly to the rotor insert unit with the translation unit, and step 304 is inserting the rotor into a stator of the electrical machine with the load unit.

In an embodiment the step 303 of translating the magnetized rotor is performed by the translation unit by pivoting the rotor flip assembly 30, with rotational forces from a rotor flip drive 35, from a first position to a second position.

According to an embodiment of the invention the step of magnetization, the rotor flip assembly 30 provides a down force on the rotor to keep the rotor in position in respect to the magnetizer unit by means of a rotor flip arm 31.

In an embodiment of the step 304 of inserting comprises, the rotor load unit 60 receiving the stator 25 of the electrical machine at a stator fixture 42, the rotor load unit 60 fixating a shaft of the rotor 20 at a first and a second end of the shaft 21 at a first and a second fixture 38, 39, the stator fixture 42 moving linearly in respect to the rotor thereby moving the stator linearly and inserting the rotor into the stator.

In another embodiment of the invention the step 304 of inserting comprises: the rotor load unit 60 receives the stator 25 of the electrical machine at a stator fixture 42, rotor load unit 60 fixating a shaft 21 of the rotor 20 at a first and a second end of the shaft at a first and a second fixture 38, 39, the first and a second fixture moving linearly in respect to the stator fixture thereby moving the rotor linearly and positioning the stator 25 in relation to the rotor 20.

Any range or device value given herein may be extended or altered without losing the effect sought, as will be apparent to the skilled person.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A device for magnetizing a rotor of an electrical machine, wherein the rotor comprises permanent magnet material, said device comprising:
   a yoke with an electromagnetic coil arranged to produce a pulsed magnetic field for magnetizing the permanent magnet material, wherein the magnetic field is sufficient to magnetize a permanent magnetic pole, and wherein the rotor and yoke are in a fixed relation to each other when the electromagnetic coil is producing the pulsed magnetic field; and a rotor nest arranged on the yoke, wherein the rotor nest is arranged between the yoke and the rotor.

2. A device according to claim 1, wherein the rotor is displaced in the radial direction before magnetizing a further permanent magnetic pole.

3. A device according to claim 2, wherein the device further comprising an indexer to rotate the rotor around a shaft of the rotor, the indexer is arranged to ensure that the magnetic material in the rotor is positioned in respect to the yoke.

4. A device according to claim 1, wherein the ratio between the length of the at least one permanent magnetic pole and the length of the yoke is less than or equal to one.

5. A device according to claim 1, wherein the ratio between the length of the at least one permanent magnetic pole and the length of the yoke is between one and two, and wherein the rotor is displaced in the axial direction of the rotor between a first and a second magnetic pulse.

6. A device according to claim 1, wherein the yoke comprises a recessed area, wherein the recessed area is shaped to receive an angular section of the rotor.

7. A device according to claim 1, wherein the device further comprises a cooling arrangement for cooling the yoke.

8. A device according to claim 1, wherein the device further comprising a power supply to provide electrical energy to the electromagnetic coil in the yoke to generate a magnetic field in order magnetize the permanent magnetic material.

9. A device according to claim 1, wherein the device further comprising a clamp for maintaining the rotor in a fixed relation in respect to the yoke during magnetization.

10. A device according to claim 1, wherein the device further comprises an upper yoke with an second electromagnetic coil arranged to produce a pulsed magnetic field for magnetizing the permanent magnet material, wherein the magnetic field is sufficient to magnetize a second permanent magnetic pole; and wherein the rotor and second yoke is in a fixed relation to each other when the upper yoke is producing the pulsed magnetic field.

11. A device according to claim 10, wherein the yoke and the upper yoke are arranged so that the yoke and the upper yoke magnetize a permanent magnetic pole while the rotor and yokes are in a fixed relation to each other.

12. A device according to claim 1, wherein a yoke and an electromagnetic coil are mounted on a base, wherein the base includes a handling tool that holds the rotor, and wherein the handling tool is rotatable around an axis to move the rotor from a first position relative to the base to a second position relative to the base.

13. A device according to claim 12, wherein the base further comprises a rotor load unit arranged at the second position relative to the base, wherein the rotor can be attached to the rotor load unit, and wherein the rotor load unit is displaceable relative to the base to move the attached rotor into an installed arrangement in a stator.

14. A method for magnetizing a rotor of an electrical machine, wherein the rotor comprises permanent magnet material, said method comprising:

arranging the rotor in respect to a yoke, wherein the yoke has an electromagnetic coil arranged to produce a pulsed magnetic field, wherein a rotor nest is arranged on the yoke such that the rotor nest is between the yoke and the rotor when the rotor is arranged with respect to the yoke; and pulsing the magnetic field for magnetizing the permanent magnet material, wherein the magnetic field is sufficient to magnetize a permanent magnetic pole.

15. A method according to claim 14 further comprising displacing the rotor in the radial direction before magnetizing a further permanent magnetic pole.

16. A method according to claim 14, wherein the ratio between the length of the at least one permanent magnetic pole and the length of the yoke is between one and two, and wherein the method further comprising the step of displacing the rotor in the axial direction between a first and a second magnetic pulse.

17. A method according to claim 14, further comprising cooling the yoke with a cooling system.

18. A method according to claim 14, further comprising charging an energy storage and discharging the energy in the electromagnetic coil to produce the pulsed magnetic field.

19. A method according to claim 14, further comprising rotating the rotor around a shaft of the rotor, by means of an indexer, the indexer is arranged to ensure that the magnetic material in the rotor is positioned in respect to the yoke.

20. A device for magnetizing a rotor of an electrical machine, said device comprising:

a yoke with an electromagnetic coil arranged to produce a pulsed magnetic field, wherein said yoke includes an curvilinear surface; and a rotor nest that includes a first surface and a second surface opposite the first surface, wherein the first surface is arranged on the curvilinear surface of the yoke, and wherein the second surface of the rotor nest includes a second curvilinear surface defining a contour that is substantially similar to an outer contour of the rotor.

* * * * *